United States Patent Office 3,516,987
Patented June 23, 1970

3,516,987
1-METHYLSULFONYL-7-METHOXY-2,3,4,5-TETRA-HYDRO-1H-1-BENZAZEPINE
Charles M. C. Koo, Philadelphia, and Thomas W. Pattison and David R. Herbst, King of Prussia, Pa., assignors to American Home Products Corporation, New York, N.Y., a corporation of Delaware
No Drawing. Original application Apr. 25, 1966, Ser. No. 544,681, now Patent No. 3,458,498, dated July 29, 1969. Divided and this application Jan. 15, 1969, Ser. No. 821,526
Int. Cl. C07d 41/08
U.S. Cl. 260—239                                               1 Claim

ABSTRACT OF THE DISCLOSURE 2,3,4,5 - tetrahydro - 7 - methoxy - 1 - (methylsulfonyl)-1H-1-benzazepine, useful as diuretic, hypoglycemic, anti-bacterial, and anti-convulsant.

---

This is a division of my prior copending application, Ser. No. 544,681, filed Apr. 25, 1966, and now U.S. Pat. 3,458,498, granted July 29, 1969.

This invention relates to bicyclic nitrogen containing compounds known as benzazepines. In particular, the invention is concerned with 7-alkoxy-2,3,4,5-tetrahydro-1H-1-benzazepines having pharmacological activity.

The novel compounds which are included within the scope of this invention are represented by the following formula:

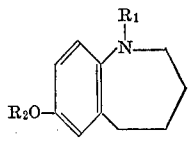

wherein $R_1$ is selected from the group consisting of hydrogen, lower alkanoyl, cyclo(lower)alkylcarbonyl, benzoyl, halobenzoyl, lower alkylbenzoyl, lower alkoxybenzoyl, lower polyalkoxybenzoyl, lower alkylsulfonyl, phenylsulfonyl, halophenylsulfonyl, lower alkylphenylsulfonyl, lower alkoxyphenylsulfonyl, lower alklycarbamoyl, phenylcarbamoyl, halophenylcarbamoyl, cyclo(lower)alkylcarbamoyl, lower alkylthiocarbamoyl, lower alkenylthiocarbamoyl, phenylthiocarbamoyl, lower alkylphenylthiocarbamoyl, lower alkoxyphenylthiocarbamoyl, halophenylthiocarbamoyl and cyclo(lower)alkylthiocarbamoyl; and $R_2$ is lower alkoxy. Examples of such compounds include: 2,3,4,5-tetrahydro-7-methoxy-1H-1-benzazepine; 1 - acetyl - 2,3,4,5 - tetrahydro - 7 - methoxy - 1H - 1-benzazepine; 1 - (4 - chlorobenzoyl) - 2,3,4,5 - tetrahydro - 7 - methoxy - 1H - 1 - benzazepine; 2,3,4,5 - tetrahydro - 7 - methoxy - 1 - (4 - tolylsulfonyl) - 1H - 1 - benzazepine; 1 - (cyclohexylcarbamoyl) - 2,3,4,5 - tetrahydro - 7 - methoxy - 1H - 1 - benzazepine; and 2,3,4,5-tetrahydro - 7 - methoxy - 1 - (phenylthiocarbamoyl)-1H-1-benzazepine.

The benzazepine compounds of the present invention are prepared by the following schematic sequence of reactions:

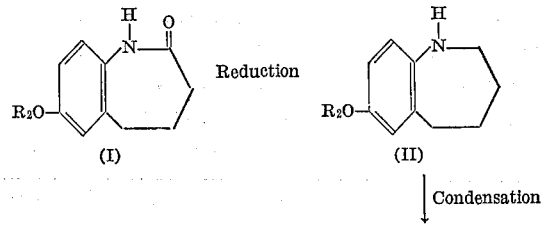

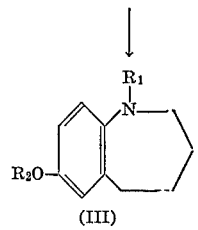

wherein $R_1$ and $R_2$ are defined as above. Reduction of the 4-[(2-amino-5-alkoxy)phenyl] butyric acid, lactam (I) may be effected by reaction with a reducing agent. Preferably this reaction is conducted in dioxane with lithium aluminum hydride under gentle reflux. Thereafter, the excess lithium aluminum hydride is decomposed with a dilute aqueous solution of an alkali metal hydroxide and the resulting 7-alkoxy-2,3,4,5-tetrahydro - 1H - 1 - benzazepine (II) is separated by conventional recovery procedures such as, filtration, concentration and crystallization.

The 7-alkoxy-2,3,4,5-tetrahydro-1-substituted - 1H - 1-benzazepine (III) of the present invention are prepared by admixing an above prepared 7-alkoxy-2,3,4,5-tetrahydro-1H-1-benzazepine (II) base with a substantially equimolar amount of an appropriate aliphatic acid; an aliphatic acid halide or anhydride; a cycloalkanoyl or aroyl halide; an alkyl or aryl sulfonyl halide; an alkyl, cycloalkyl, alkenyl or aroyl isocyanate; or an alkyl, alkenyl, cycloalkyl or aroyl isothiocyanate in a reaction-inert organic solvent at a temperature range from about 25° C. to about 100° C. for a period of about ten minutes to about five hours. When the reaction is complete, the appropriate 7-alkoxy-2,3,4,5-tetrahydro-1-substituted-1H-1-benzazepine (III) is obtained by standard methods well known to those skilled in the chemical art, e.g. dilution, extraction, concentration and crystallization.

The time and temperature ranges utilized in the above mentioned reactions are not critical and simply represent the most convenient ranges consistent with carrying out the reaction in a minimum of time without undue difculty. Thus, reaction temperatures appreciably below these can be used, but their use considerably extends the reaction time. Similarly, reaction temperatures higher than those mentioned can be employed with a concomitant decrease in reaction time. By reaction-inert organic solvent is meant any organic solvent which dissolves the reactants and does not interfere with their interaction. The amount of solvent used is not critical, it being only necessary to use sufficient solvent to provide a reaction medium for the reactants.

Many of the reactants employed to prepare the compounds of this invention are known compounds which are available from commercial sources, while the remainder can be prepared in accordance with standard organic procedures well known to those skilled in the art. The 4-[(2-amino-5-alkoxy)phenyl] butyric acid, lactams are prepared from the corresponding 6-alkoxytetralones by the procedure of G. Schroeter, Chem. Ber., 63, 1324 (1930).

In accord with the present invention, the compounds of the present invention have been found to possess interesting pharmaceutical properties which render them useful as synthetic medicinals. More particularly, these compounds, in standard pharmacological tests, have exhibited utility as diuretics, hypoglycemics, anti-bacterials and anti-convulsants. Further, the 7-alkoxy-2,3,4,5-tetrahydro-1H-1-benzazepines (II) are used as intermediates in the preparation of the 7-alkoxy-2,3,4,5-tetrahydro-1-substituted-1H-1-benzazepine (III) compounds of this invention.

When the compounds of this invention are employed as diuretics, hypoglycemics, anti-bacterials and anti-convulsants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 25 mg. to about 1000 mg. per day, although as aforementioned, variations will occur. However, a dosage level that is in the range of from about 75 mg. to about 400 mg. per day is most desirably employed in order to achieve effective results.

The following examples are given by way of illustration and are not to be construed as limitations of this invention, many variations of which are possible without departing from the scope and spirit thereof.

EXAMPLE I

A solution of 10 g. 4-[(2-amino-5-methoxy)phenyl] butyric acid, lactone in 100 ml. of dioxane is added to a stirred suspension of 2.98 g. 95% lithium aluminum hydride in 100 ml. dioxane such that gentle reflux is maintained. After one hour of refluxing, the reaction mixture is cooled, cautiously treated with 15 ml. 3% w./v. aqueous sodium hydroxide and filtered. The insolubles are thoroughly washed with ether and the combined organic fractions are freed of solvent. Dissolution of the oily residue in 2 N hydrochloric acid, washing of the acidic solution with ether followed by basification with potassium carbonate, extraction with ether and removal of the solvent afford 2,3,4,5-tetrahydro-7-methoxy-1H-1-benzazepine as an oil. This base is dissolved in ether and treated with excess hydrogen chloride to form the hydrochloride salt which, after two recrystallizations from nitromethane exhibits, M.P. 204.5–207.0° C.

$\lambda_{max.}^{KBr}$ 3.75, 3.99, 4.10$\mu$, $\lambda_{max.}^{95\% EtOH}$ 230 ($\epsilon$ 7,760), 275.5 ($\epsilon$ 1,280), 282 ($\epsilon$ 1,410) m$\mu$ Analysis.—For $C_{11}H_{15}NO \cdot HCl$. Calcd. (percent): C, 61.81; H, 7.55; Cl, 16.59; N, 6.56. Found (percent): C, 61.66; H, 7.54; Cl, 17.10; N, 6.57.

EXAMPLE II

A solution of 2,3,4,5 - tetrahydro-7-methoxy-1H-1-benzazepine (generated by basification of an aqueous solution of 5.34 g. of the hydrochloride, prepared in Example I, with aqueous sodium hydroxide and extraction with ether), 50 ml. pyridine and 3.87 g. benzoyl chloride (3.17 ml.) is kept at 25° C. for seventeen hours. Dilution of the reaction solution with ice-water, thorough extraction with ether followed by successive washings of the extracts with dilute hydrochloric acid, dil. aqueous potassium bicarbonate, brine and drying (sodium sulfate) and distillation of the solvent yield crude amide. Two recrystallizations of this product from acetone-n-hexane afford 1-benzoyl-2,3,4,5-tetrahydro - 7 - methoxy-1H-1-benzazepine, M.P. 134–136° C., $\lambda_{max.}^{KBr}$ 6.09$\mu$ The following compounds are prepared in this manner by treating 2,3,4,5 - tetrahydro-7-methoxy-1H-1-benzazepine with an appropriate benzoyl chloride:

1-(4-bromobenzoyl)-2,3,4,5-tetrahydro - 7 - methoxy-1H-1-benzazepine;

1-(3-iodobenzoyl)-2,3,4,5-tetrahydro - 7 - methoxy-1H-1-benzazepine;

2,3,4,5-tetrahydro - 7 - methoxy-(4-propylbenzoyl)-1H-1-benzazepine;

1-(4-fluorobenzoyl) - 2,3,4,5 - tetrahydro-7-methoxy-1H-1-benzazepine;

1-(2-ethylbenzoyl) - 2,3,4,5 - tetrahydro-7-methoxy-1H-1-benzazepine; and 1-(4-ethoxybenzoyl) - 2,3,4,5 - tetrahydro-7-methoxy-1H-1-benzazepine.

EXAMPLE III

Repeating the procedure of Example II to react 2,3,4,5-tetrahydro-7-methoxy-1H-1-benzazepine with the hereinafter listed reactants, the following products are obtained.

| Reactant | Product | M.P., ° C. | Recrystallizing solvent | $\lambda_{max.}^{KBr} (\mu)$ |
| --- | --- | --- | --- | --- |
| Acetic anhydride [1] | 1-acetyl-2,3,4,5-tetrahydro-7-methoxy-1H-1-benzazepine | 80–83 | n-Hexane | 6.05 |
| Pivaloyl chloride [2] | 2,3,4,5-tetrahydro-7-methoxy-1-pivaloyl-1H-1-benzazepine | 72.5–75.0 | do | 6.15 |
| Cyclopropanecarbonyl chloride | 1-(cyclopropylcarbonyl)-2,3,4,5-tetrahydro-7-methoxy-1H-1-benzazepine. | 62–63 | do | 6.11 |
| Cyclopentanecarbonyl chloride [2] | 1-(cyclopentylcarbonyl)-2,3,4,5-tetrahydro-7-methoxy-1H-1-benzazepine. | 57–59 | do | 6.11 |
| Cyclohexanecarbonyl chloride [2] | 1-(cyclohexylcarbonyl)-2,3,4,5-tetrahydro-7-methoxy-1H-1-benzazepine. | 69–70 | do | 6.08 |
| p-Chlorobenzoyl chloride | 1-(4-chlorobenzoyl)-2,3,4,5-tetrahydro-7-methoxy-1H-1-benzazepine. | 70–73 | do | 6.10 |
| p-Toluoyl chloride | 2,3,4,5-tetrahydro-7-methoxy-1-(4-toluoyl)-1H-1-benzazepine. | 78–81 | do | 6.11 |
| Anisoyl chloride | 1 (4 anisoyl) 2,3,4,5-tetrahydro-7-methoxy-1H-1-benzazepine. | 107.5–110.0 | Acetone-n-hexane | 6.15 |
| 3,4,5-trimethoxybenzoyl chloride | 2,3,4,5 tetrahydro-7-methoxy-1-(3,4,5-trimethoxybenzoyl)-1H-1-benzazepine. | 109–112 | do | 6.12 |
| p-Chlorobenzenesulfonyl chloride [2] | 1-(4-chlorophenylsulfonyl)-2,3,4,5-tetrahydro-7-methoxy-1H-1-benzazepine. | 132.5–134.0 | Ethyl acetate | 7.46, 8.63 |
| p-Toluenesulfonyl chloride [1] | 2,3,4,5-tetrahydro-7-methoxy-1-(4-tolylsulfonyl)-1H-1-benzazepine. | 128–130 | Methanol | 7.47, 8.65 |

[1] The extraction solvent is chloroform; [2] The crude product is chromatographically purified on neutral, activity III alumina prior to crystallization.

EXAMPLE IV

A solution of 2,3,4,5-tetrahydro - 7 - methoxy-1H-1-benzazepine (5.4 g.), 100 ml. pyridine and 6.3 g. p-methoxybenzenesulfonyl chloride is stirred at 25° C. for fifteen hours. Thereafter, the reaction mixture is diluted with ice-water, extracted with ether followed by successive washings of the extracts with dilute hydrochloric acid, dil. aqueous potassium bicarbonate, brine and drying (sodium sulfate) and distillation of the solvent yield crude product. Two recrystallizations of this product from acetone-n-hexane afford 2,3,4,5 - tetrahydro-7-methoxy-1-(4-ethoxyphenylsulfonyl) - 2,3,4,5 - tetrahydro-7-pro-92–94° C.

$\lambda^{KBr}_{max.}$ 7.50, 8.72μ

Similarly, the following compounds are produced:
1-(4-butylsulfonyl) - 2,3,4,5- - tetrahydro-7-methoxy-1H-1-benzazepine.
1-(4-bromophenylsulfonyl) - 7 - ethoxy-2,3,4,5-tetrahydro-1H-1-benzazepine; and
1-(4-ethoxyphenylsulfonyl) - 2,3,4,5 - tetrahydro-7-propoxy-1H-1-benzazepine.

EXAMPLE V

A solution of 2,3,4,5-tetrahydro-7-methoxy-1H-1-benzazepine (generated by basification of an aqueous solution of 10.00 g. of the hydrochloride with aqueous potassium hydroxide and extraction with ether), 50 ml. pyridine and 8.27 g. of benzenesulfonylchloride are admixed and stirred for twenty-four hours at 25° C. Dilution of the reaction solution with ice-water, thorough extraction with ether followed by successive washings of the extracts with dilute hydrochloric acid, dil. aqueous potassium bicarbonate, brine and drying (sodium sulfate) and distillation of the solvent yield the crude product. Two recrystallizations of this product from acetone-n-hexane yield 2,3,4,5-tetrahydro-7-methoxy- 1 - (phenylsulfonyl)-1H-1-benzazepine, M.P. 124–126° C.

$\lambda^{KBr}_{max.}$ 7.57, 8.65μ

Similarly, 2,3,4,5-tetrahydro-1-(2-iodophenylsulfonyl)-7-propoxy-1H-1-benzazepine and 1-(4-butoxyphenylsulfonyl)-2,3,4,5-tetrahydro-7-methoxy - 1H - 1 - benzazepine are produced.

EXAMPLE VI

A solution of 2,3,4,5-tetrahydro-7-methoxy-1H-1-benzazepine (20.0 g.), 200 ml. pyridine and 12.9 g. of methanesulfonyl chloride are admixed with stirring for seventeen hours at 25° C. Thereafter, the reaction mixture is admixed with ice-water, extracted with ether followed by successive washings of the extracts with dilute hydrochloric acid, dil. aqueous potassium bicarbonate, brine and drying (sodium sulfate). Distillation of the solvent yields crude product. Two recrystallizations of this product from acetone-n-hexane yield 2,3,4,5-tetrahydro-7-methoxy-1-(methylsulfonyl)-1H-1-benzazepine, M.P. 84–85° C.

$\lambda^{KBr}_{max.}$ 7.53, 8.70

In the same manner, 7-ethoxy-1-(p-ethylphenylsulfonyl)-2,3,4,5-tetrahydro - 1H - 1 - benzazepine and 1-(p-fluorophenylsulfonyl)-2,3,4,5-tetrahydro-7-propoxy - 1H-1-benzazepine are obtained.

EXAMPLE VII

Reflux 2,3,4,5-tetrahydro-7-methoxy-1H-1-benzazepine (prepared from 16.03 g. of the hydrochloride) with 50 ml. 98% formic acid for three and a half hours. Thereafter, the reaction mixture is admixed with ice-water and extracted with ether. The combined extracts are washed with dilute hydrochloric acid, brine and dried (sodium sulfate). Evaporation of the solvent and crystallization of the residue from ether-n-hexane and from carbon tetrachloride-n-hexane gives 1-formyl - 2,3,4,5 - tetrahydro-7-methoxy-1H-1-benzazepine, M.P. 60–62° C.

$\lambda^{KBr}_{max.}$ 6.02μ

EXAMPLE VIII

To 8.55 g. 2,3,4,5-tetrahydro-7-methoxy-1H-1-benzazepine, hydrochloride in 50 ml. methanol is added 2.16 g. sodium methoxide. The mixture is stirred for five minutes, filtered and the filtrate is freed of solvent by evaporation. Drying of the base thus prepared is achieved by addition and distillation of 50 ml. toluene. Thereafter, the dry amine is refluxed with 4.17 g. n-butyl isocyanate (4.80 ml.) and 75 ml. benzene for two hours. After removal of the benzene, the residue is dissolved in chloroform, washed with dilute hydrochloric acid, brine and dried (sodium sulfate). Evaporation of the chloroform and two recrystallizations of the residue from ether-n-hexane yield 1-(butylcarbamoyl) - 2,3,4,5-tetrahydro-7-methoxy-1H-1-benzazepine, M.P. 66–68° C.

$\lambda^{KBr}_{max.}$ 3.08, 6.10μ

EXAMPLE IX

To 4.28 g. 2,3,4,5-tetrahydro-7-methoxy-1H-1-benzazepine, hydrochloride in 25 ml. methanol is added 1.08 g. sodium methoxide. The mixture is stirred five minutes, filtered and the filtrate evaporated. Drying of the base thus prepared is achieved by addition and distillation of 25 ml. toluene, and the dry amine is refluxed with 3.0 g. phenyl isocyanate and 75 ml. benzene for three hours. After removal of the benzene, the residue is dissolved in chloroform, washed with dilute hydrochloric acid, brine and dried (sodium sulfate). Evaporation of the chloroform and two recrystallizations of the residue from acetone- n -hexane yield 2,3,4,5 - tetrahydro - 7 - methoxy-1-(phenylcarbamoyl) - 1H - 1 - benzazepine, M.P. 146.5–148.5° C.

$\lambda^{KBr}_{max.}$ 3.05, 6.03μ

EXAMPLE X

The procedure described in Examples VIII and IX is repeated reacting a 7-alkoxy - 2,3,4,5 - tetrahydro - 1H-1-benzazepine with an appropriate hereinafter listed isocyanate to produce the following benzazepines:

| Reactants | Products |
| --- | --- |
| 2,3,4,5-tetrahydro-7-methoxy-1H-1-benzazepine and cyclopentyl isocyanate | 1-(cyclopentylcarbamoyl)-2,3,4,5-tetrahydro-7-methoxy-1H-1-benzazepine |
| 7-ethoxy-2,3,4,5-tetrahydro-1H-1-benzazepine and methyl isocyanate | 7-ethoxy-2,3,4,5-tetrahydro-1-(methylcarbamoyl)-1H-1-benezazepine |
| 2,3,4,5-tetrahydro-7-methoxy-1H-1-benezazepine and p-tolyl isocyanate | 2,3,4,5-tetrahydor-7-methoxy-1-(p-tolylcarbamoyl)-1H-1-benezazepine |
| 2,3,4,5-tetrahydro-7-propoxy-1H-1-benzazepine and m-methoxyphenyl isocyanate | 2,3,4,5-tetrahydor-1-(m-methoxyphenylcarbamoyl)-7-propoxy-1H-1-benzazepine |
| 2,3,4,5-tetrahydro-7-methoxy-1H-1-benzazepine and p-ethyphenyl isocyanate | 1-(p-ethylphenylcarbamoyl)-2,3,4,5-tetrahydro-7-methoxy-benzazepine |
| 2,3,4,5-tetrahydro-7-methoxy-1H-1-benzazepine and p-butylphenyl isocyanate | 1-(p-butylphenylcarbamoyl)-2,3,4,5-tetrahydro-7-methoxy-1H-1-benzazepine |
| 2,3,4,5-tetrahydro-7-methoxy-1H-1-benzazepine and p-propoxyphenyl isocyanate | 2,3,4,5-tetrahydro-7-methoxy-1-(p-propoxyphenylcarbamoyl)-1H-1-benzazepine. |

EXAMPLE XI

To 8.0 g. 2,3,4,5-tetrahydro-7-methoxy-1H-1-benzazepine, hydrochloride in 50 ml. methanol is added 2.03 g. sodium methoxide. The mixture is stirred five minutes, filtered and the filtrate is freed of solvent. Drying of the base thus prepared is achieved by addition and distillation of 50 ml. toluene, and the dry amine is refluxed with 4.7 g. cyclohexyl isocyanate and 75 ml. benzene for two hours. After removal of the benzene, the residue is dissolved in chloroform, washed with dilute hydrochloric acid, brine and dried (sodium sulfate). Evaporation of the chloroform and two recrystallizations of the residue from ether - n - hexane yield 1-(cyclohexylcarbamoyl)-2,3,4,5-tetrahydro-7-methoxy-1H-1-benzazepine, M.P. 70–73° C.

$\lambda_{max.}^{KBr}$ 3.06, 6.11

Similarly, 1-(p-chlorophenylcarbamoyl)-2,3,4,5-tetrahydro-7-methoxy-1H-1-benzazepine;
1-(p-bromophenylcarbamoyl)-2,3,4,5-tetrahydro-7-methoxy-1H-1-benzazepine; and
7-ethoxy-2,3,4,5-tetrahydro-1-(p-iodophenylcarbamoyl)-1H-1-benzazepine are prepared.

EXAMPLE XII

A mixture of 10.68 g., 2,3,4,5-tetrahydro-7-methoxy-1H-1-benzazepine hydrochloride, 250 ml. absolute ethanol and 2.70 g. sodium methoxide is stirred at 25° C. for fifteen minutes. Allyl isothiocyanate (5.21 g., 5.13 ml.) is added, the mixture is refluxed four hours, and then the solvent is distilled. A benzene extract of the residue is washed with dilute hydrochloric acid, brine, dried (sodium sulfate), freed of solvent and the crude product is triturated with n-hexane and twice recrystallized from isopropanol. In this manner is obtained 1-(allylthiocarbamoyl)-2,3,4,5-tetrahydro - 7 - methoxy-1H-1-benzazepine, M.P. 91–94° C.

$\lambda_{max.}^{KBr}$ 3.06μ

Similarly, the following compounds are prepared:

1-(2-butenylthiocarbamoyl)-2,3,4,5-tetrahydro-7-methoxy-1H-1-benzazepine;
2,3,4,5-tetrahydro-7-methoxy-1-(methylthiocarbamoyl)-1H-1-benzazepine; and
1-(isobutylthiocarbamoyl)-2,3,4,5-tetrahydro-7-methoxy-1H-1-benzazepine.

EXAMPLE XIII

A mixture of 5.0 g., 2,3,4,5-tetrahydro-7-methoxy-1H-1-benzazepine hydrochloride, 125 ml. absolute ethanol and 1.3 g. sodium methoxide is stirred at 25° C. for one-half hour. Phenylisothiocyanate (3.2 g.) is added, the mixture is refluxed four hours, and then the solvent is distilled. An ethyl acetate extract of the residue is washed with dilute hydrochloric acid, brine, dried (sodium sulfate), freed of solvent and the crude product is triturated with n-hexane and twice recrystallized from acetone-n-hexane.

In this manner is obtained 2,3,4,5-tetrahydro-7-methoxy-1-(phenylthiocarbamoyl)-1H-1-benzazepine, M.P. 139.5–141.5° C. (dec.)

$\lambda_{max.}^{KBr}$ 3.06μ

EXAMPLE XIV

Employing the procedure of Example XIII reacting a 7-alkoxy-2,3,4,5-tetrahydro-1H-1-benzazepine with an appropriate phenyl isothiocyanate, the hereinafter listed benzazepines are obtained:

7-ethoxy-2,3,4,5-tetrahydro-1-(p-tolylthiocarbamoyl)-1H-1-benzazepine;
1-(m-butylphenylthiocarbamoyl)-2,3,4,5-tetrahydro-7-methoxy-1H-1-benzazepine;
2,3,4,5-tetrahydro-1-(p-methoxyphenylthiocarbamoyl)-7-methoxy-1H-1-benzazepine;
1-(p-ethoxyphenylthiocarbamoyl)-2,3,4,5-tetrahydro-7-propoxy-1H-1-benzazepine;
2,3,4,5-tetrahydro-7-methoxy-1-(p-propoxyphenylthiocarbamoyl)-1H-1-benzazepine;
1-(p-chlorophenylthiocarbamoyl)-7-butoxy-2,3,4,5-tetrahydro-1H-1-benzazepine;
1-(o-bromophenylthiocarbamoyl)-2,3,4,5-tetrahydro-7-methoxy-1H-1-benzazepine;
2,3,4,5 - tetrahydro - 1 - (p - iodophenylthiocarbamoyl)-7-methoxy-1H-1-benzazepine; and
7 - ethoxy - 1 - (p - fluorophenylthiocarbamoyl) - 2,3,4,5-tetrahydro-1H-1-benzazepine.

EXAMPLE XV

A mixture of 10.0 g., 2,3,4,5-tetrahydro-7-methoxy-1H-1-benzazepine hydrochloride, 250 ml. absolute ethanol and 2.6 g. sodium methoxide is stirred at 25° C. for one half hour. Cyclohexylisothiocyanate (6.6 g.) is added, the mixture is refluxed five hours, and then the solvent is distilled. A benzene extract of the residue is washed with dilute hydrochloric acid, brine, dried (sodium sulfate), freed of solvent and the crude product is triturated with n-hexane and twice recrystallized from acetone-n-hexane to yield 1-(cyclohexylthiocarbamoyl)-2,3,4,5-tetrahydro-7-methoxy-1H-1-benzazepine, M.P. 95–98° C.

$\lambda_{max.}^{KBr}$ 3.04μ

In the same manner, 1-(cyclobutylthiocarbamoyl)-2,3,4,5-tetrahydro-7-methoxy-1H-1-benzazepine is produced.

What is claimed is:
1. A compound which is: 2,3,4,5-tetrahydro-7-methoxy-1-(methylsulfonyl)-1H-1-benzazepine.

References Cited

UNITED STATES PATENTS 3,093,632   6/1963   Mull _____ 260—239

ALTON D. ROLLINS, Primary Examiner

U.S. Cl. X.R.

260—239.3; 424—244